US012705202B2

(12) United States Patent
Toma et al.

(10) Patent No.: US 12,705,202 B2
(45) Date of Patent: Aug. 11, 2026

(54) SYSTEMS AND METHODS FOR HIGH BANDWIDTH MEMORY WITH UNIDIRECTIONAL DATA FLOW

(71) Applicant: Google LLC, Mountain View, CA (US)

(72) Inventors: Horia Alexandru Toma, Sunnyvale, CA (US); Gurushankar Rajamani, Sunnyvale, CA (US); Sukalpa Biswas, Fremont, CA (US); Robert S. Sprinkle, Waikoloa, HI (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/792,169

(22) Filed: Aug. 1, 2024

(65) Prior Publication Data

US 2025/0045238 A1 Feb. 6, 2025

Related U.S. Application Data

(60) Provisional application No. 63/530,106, filed on Aug. 1, 2023.

(51) Int. Cl.
*G06F 13/42* (2006.01)

(52) U.S. Cl.
CPC ................................ *G06F 13/4234* (2013.01)

(58) Field of Classification Search
CPC ............. G06F 13/4234; G06F 13/1684; G06F 13/1678; G11C 5/04; G11C 7/1075
USPC .......................................................... 711/154
See application file for complete search history.

(56) References Cited

U.S. PATENT DOCUMENTS 5,901,332 A * 5/1999 Gephardt ............ G06F 13/4018 710/41
11,841,815 B1 * 12/2023 Farjadrad ............ H03M 13/615
12,204,794 B1 * 1/2025 Ziai ....................... G06F 3/0673
2004/0233208 A1 * 11/2004 Hussain .................... G06T 1/20 345/506
2008/0137394 A1 6/2008 Shimano et al.
2016/0364290 A1 12/2016 Geng et al.
2017/0053711 A1 * 2/2017 Shibata ............ G11C 29/56012
2024/0061741 A1 * 2/2024 Agarwal ................ G11C 29/10

FOREIGN PATENT DOCUMENTS

EP 4089543 A1 11/2022
WO 2014016651 A1 1/2014

OTHER PUBLICATIONS

Extended European Search Report for European Patent Application No. 24192218.6 dated Nov. 27, 2024. 12 pages.
Office Action for European Patent Application No. 24192218.6 dated Feb. 16, 2026. 7 pages.

* cited by examiner

*Primary Examiner* — Jared I Rutz
*Assistant Examiner* — Wei Ma
(74) *Attorney, Agent, or Firm* — Lerner David LLP

(57) ABSTRACT

The present application relates to systems and methods for providing high bandwidth connections between memory and computing units. For example, memory units can be configured to perform concurrent read and write operations in parallel to one another. The memory units can also be configured to alter the relative bandwidths that are available for the read and write operations. For example, bi-directional transmission interfaces of a memory unit can be assigned to operate as uni-directional interfaces that are a part of either a data input path or a data output path.

19 Claims, 5 Drawing Sheets

100'

SYSTEMS AND METHODS FOR HIGH BANDWIDTH MEMORY WITH UNIDIRECTIONAL DATA FLOW

CROSS-REFERENCE TO RELATED APPLICATIONS

This application claims the benefit of the filing date of U.S. Provisional Patent Application No. 63/530,106 filed Aug. 1, 2023, the disclosure of which is hereby incorporated herein by reference.

BACKGROUND

High-speed computing can be performed using computing packages in which computing dies control read and write operations to be performed by high bandwidth memory. However, the bandwidth of data transmissions for high-bandwidth memory read and write operations are currently impeded by the time required for the high-bandwidth memory to transition between read transmissions and write transmissions.

BRIEF SUMMARY

The present application relates to systems and methods for providing high bandwidth connections between memory and computing units. In accordance with aspects of the disclosure, memory units can be configured to perform concurrent read and write operations in parallel to one another. The memory units can also be configured to alter the relative bandwidths that are available for the read and write operations. For example, bi-directional transmission interfaces of a memory unit can be assigned to operate as uni-directional interfaces that are a part of either a data input path or a data output path.

In accordance with aspects of the disclosure, a system for computing and memory communication may include a computing unit, and a high-bandwidth memory (HBM), having a plurality of data transmission interfaces. The HBM may be configured to assign a first subset of the data transmission interfaces to operate as a data input path for receiving data corresponding to write operations, and to assign a second subset of the data transmission interfaces to operate as a data output path for transmitting data corresponding to read operations. The HBM may be further configured to communicate with the computing unit so as to perform a read operation and a write operation in parallel.

In accordance with other aspects of the disclosure, the HBM may be further configured so that the data output path and the data input path each operate as unidirectional transmission paths.

In accordance with still other aspects of the disclosure, the plurality of data transmission interfaces may be bi-directional data interfaces, and wherein the HBM is configured to assign the first subset of data transmission interfaces and the second subset of the data transmission interfaces based on one or more inputs received from the computing unit.

In accordance with yet other aspects of the disclosure, the HBM may be further configured to assign the plurality of data transmission interfaces to the first subset and the second subset based on a determined relative ratio between a number of data transmission interfaces that are in the first subset and the second subset. The HBM may be further configured to re-assign one or more data transmission interfaces of the plurality of data transmission interfaces with respect to being in either the first subset or second subset. Re-assigning the one or more data transmission interfaces may result in altering a relative ratio of data transmission interfaces that are in the first subset and the second subset.

In accordance with other aspects of the disclosure, the HBM may be further configured to have a write-address input for receiving transmissions identifying one or more addresses for write operations and a read-address input for receiving transmissions identifying one or more addresses for read operations. The HBM may be further configured to identify a coherency conflict in connection with one or more write operations and one or more read operations. The HBM may be further configured to perform the one or more write operations and read operations in a determined order based on identifying the coherency conflict. The HBM may be further configured to transmit coherency-related data to the computing unit.

In accordance with still other aspects of the disclosure, a method for computing and memory communication may include: assigning, by a high-bandwidth memory (HBM), a first subset of data transmission interfaces to operate as a data input path for receiving data corresponding to write operations and a second subset of data transmission interfaces to operate as a data output path for transmitting data corresponding to read operations: receiving, by the HBM, a first transmission identifying a read operation to be performed and a second transmission identifying a write operation to be performed; and performing, by the HBM, the write operation using the first subset of data transmission interfaces and the read operation using the second subset of data transmission interfaces. In addition, the write operation and the read operation may be performed by the HBM in parallel.

In accordance with aspects of the disclosure the plurality of data transmission interfaces may be bi-directional data interfaces, and wherein the HBM is configured to assign the first subset of data transmission interfaces and the second subset of the data transmission interfaces based on one or more inputs received from the computing unit. In addition, the first subset and second subset may be assigned in accordance with a determined relative ratio.

In accordance with other aspects of the disclosure, the method may include re-assigning one or more data transmission interfaces with respect to being in the first subset or second subset. Re-assigning the one or more data transmission interfaces may result in altering a relative ratio of data transmission interfaces that are in the first subset and the second subset.

In accordance with still other aspects of the disclosure, the HBM may receive the first transmission via a read-address input and the second transmission via a write-address input. The method may further include identifying a coherency conflict in connection with one or more write operations and one or more read operations. In addition, the method may further include performing, by the HBM, the one or more write operations and read operations in a determined order based on the coherency conflict. The method may also include transmitting, by the HBM, coherency-related data to the computing unit.

DETAILED DESCRIPTION

Figure 1A:
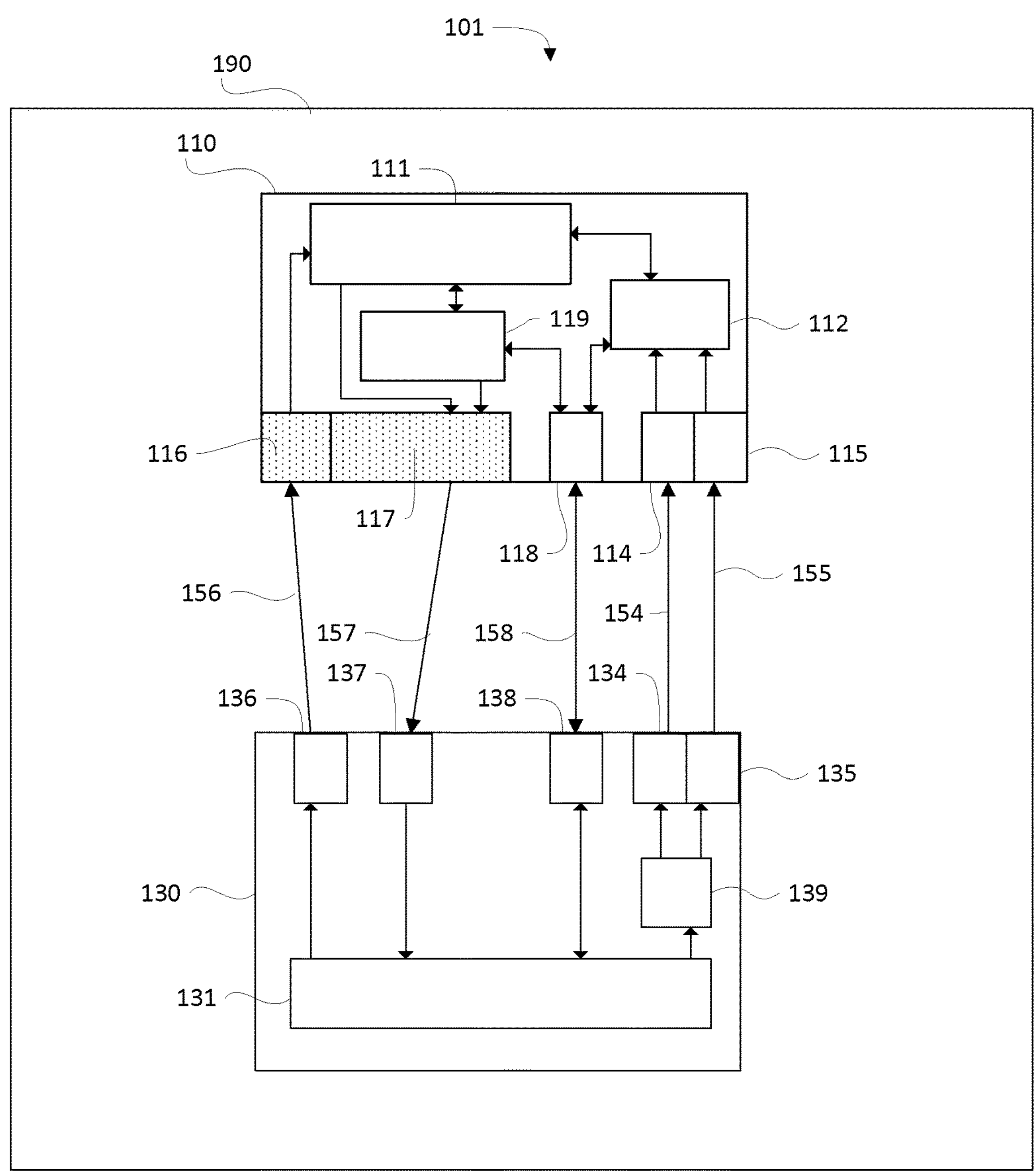
FIG. 1A is a block diagram of a system configured for performing read and write operations in accordance with aspects of the disclosure.

The technology relates to high bandwidth processing using memory units that are configured to allow for independent read and write operations. In accordance with aspects of the disclosure, memory units can be configured to perform concurrent read and write operations in parallel to one another. The disclosed system may also perform coherency checks to determine if potential conflicts exist between the read and write operations. The memory units can also be configured to alter the relative bandwidths that are available for the read and write operations.

FIG. 1 is a block diagram 100 of a system 101 in accordance with aspects of the disclosure. System 101 includes a high-bandwidth memory (HBM) 110 and a computing unit 130. The computing unit 130 is configured to perform high bandwidth processing using one or more processors 131. HBM 110 contains memory 111 for storing data, and HBM 110 may perform read operations and write operations in connection with storing and accessing data within memory 111. In connection with the processing that is performed by system 101, computing unit 130 may communicate with HBM 110 and command HBM 110 to perform particular read and write operations. Communication between HBM 110 and computing unit 130 may be performed via a plurality of transmission paths. These transmission paths 154-158 may be connected to transmission interfaces 114-118 of HBM 110 and to transmission interfaces 134-138 of computing unit 130.

The commands to perform read and write operations include identification of one or more memory addresses for which the operation is to be performed. For example, computing unit 130 contains a read-address output 134, which is configured to transmit signals that identify memory addresses for commands to perform read operations. In addition, write-address output 135 is configured to transmit signals that identify memory addresses for commands to perform write operations. Read-address output 134 transmits signals that travel along read-address path 154 and are received by HBM 110 at read-address input 114. Write-address output 135 transmits signals that are transmitted along write-address path 155 and are received by HBM 110 at write-address input 115. Upon HBM 110 receiving signals at read-address input 114 and/or write-address input 115, those signals can be sent to address-processing controller 112. Address-processing controller 112 can take the form of a programmable processor, hardware, or some combination of firmware and software. Address-processing controller 112 can be configured to identify one or more memory addresses that are contained within the received signals. Through the address-processing controller 112, the HBM can be said to be configured to perform operations, such as reading, writing, or assigning pins in a data path for input/output, as discussed herein.

If the signal is received by read-address input 114, then address-processing controller 112 is configured to have HBM 110 perform a read operation, so that data from the identified memory addresses are read from memory 111. The data read from the identified address can then be transmitted by HBM 110 via one or more data transmission interfaces 117. If the signal is received by write-address input 115, then address-processing controller 112 is configured to have HBM 110 to perform a write operation, so that data received from one or more data transmission interfaces 116 are written to the memory address that have been identified from the received signal. Data transmission interfaces 116, 117 may include, for example, a plurality of pins and one or more data buses, wherein the pins can be assigned to operate as either an input or an output in accordance with a data bus. In addition, data transmission interfaces 116,117 may be configured to transmit data in accordance with universal chiplet interconnect express (UCIe) as well as through using optical data paths.

In accordance with aspects of the disclosure, the plurality of data transmission interfaces 116, 117 of HBM 110 can be assigned to operate as part of a data input path or as part of a data output path. For example, data transmission interfaces 116, 117 may take the form of a plurality of pins that are capable of bi-directional transmissions, however HBM 110 may assign the pins to operate either as a data output path or a data input path. For system 101, a first subset of data transmission interfaces 116 have been assigned to operate as interfaces for a data input path 156, while a second subset of data transmission interfaces 117 have been assigned to operate as interfaces for a data output path 157. Thus, data transmission interfaces 116 are available to receive data from computing unit 130 in connection with a write operation that is being performed by HBM 110. In addition, data transmission interfaces 117 are available to transmit data to computing unit 130 in connection with a read operation that is being performed by HBM 110.

By assigning data transmission interfaces 116 and 117 to perform different operations independently of one another, HBM 110 can be configured to perform read operations and write operations in parallel. For example, HBM 110 may receive a signal via read-address input 154, and perform a read operation in accordance with the received signal. As part of the read operation, HBM 110 may transmit data that has been read from identified memory addresses via a data output path that corresponds to data transmission interfaces 117. In addition, while HBM 110 is performing the read operation, HBM 110 may also receive a signal at write-address input 115, which identifies an address to which a write operation is to be performed. HBM 110 may perform this write operation prior to the termination of the read operation, in that HBM 110 may receive data from computing unit 130 at data transmission interfaces 116 while HBM 110 is still transmitting data in accordance with the read operation from data transmission interfaces 117.

System 101 may also be configured to maintain data coherency with respect to the read operations and write operations that are to be performed by HBM 110. Data coherency can be compromised if the read and write operations that are being performed by HBM 110 are in conflict with one another. For example, a requested write operation may conflict with a requested read operation if at least a portion of the data to be accessed in connection with the requested read operation will be overwritten by the requested write operation. System 101 may be configured to prevent conflicts between the read and write operations and prevent particular read and write operations from accessing the same memory region. Computing unit 130 may be configured to perform a coherency check for read and write requests.

For example, computing unit 130 may have a coherency controller 139 that is configured to identify conflicts between read and write operations that are to be performed. If computing unit 130 is preparing to transmit requests for HBM 110 to perform read and write operations, coherency controller 139 may determine whether the read and write operations access overlapping memory addresses or are otherwise in conflict with one another. If no conflict is identified, computing unit 130 may transmit requests for the read and write operations via read-address output 134 and write-address output 135 in an unspecified order, including by transmitting the read and write operations in parallel to one another. However, if a conflict is identified by coherency controller 139, computing unit 130 may determine an appropriate order for the read and write operations to occur. For example, if a write operation would overwrite data that is to be read by a pending read operation, computing unit 130 may delay sending a request for a write operation until after a particular set of read operations have already been performed. Similarly, a request for a read operation may be delayed until after a write operation has been performed. Accordingly, system 101 may be configured to allow for independent and concurrent read and write operations to be performed, while also specifying an order of read and write operations when a potential conflict is found to exist.

HBM 110 may also be configured to perform coherency checks so as to avoid potential conflicts. For example, address-processing controller 112 may be configured to identify if received read and write operations are in conflict with one another and determine if the read and write operations are to be performed in a particular order, so as to avoid the conflict. The coherency check by HBM 110 may be performed in addition to the one performed by coherency controller 139, or address-processing controller 112 may perform the coherency check in lieu of one being performed by computing unit 130.

In addition, HBM 110 may be configured to re-assign data transmission interfaces 116, 117, so as to switch the interfaces between being a part of the data input path or data output path. This re-assigning can allow system 101 to control the number of interfaces that are a part of the data input path and data output path. For example, HBM 110 may have any number of total data transmission interfaces 116, 117. In block diagram 100 of FIG. 1, HBM 110 has been configured to so that a quarter of these data interfaces have been assigned to be data transmission interfaces 116, which operate as a part of the data input path 156. The remaining three-quarters of the data interfaces have been assigned to be data transmission interfaces 117, which operate as a part of the data output path 157. Thus, HBM 110 has been configured so as to have a greater bandwidth for transmitting data in connection with read operations than the bandwidth that is available for performing write operations. However, FIG. 1B is a block diagram 100' in which HBM 110 of system 101 has been re-configured so that it now has a greater number of data transmission interfaces 116 that are operating as part of data input path 156 compared to the number of data transmission interfaces 117 that are operating as a part of the data output path 157. For example, in block diagram 100', two-thirds of the total data interfaces have been assigned to be data transmission interfaces 116, which operate as part of data input path 156, while the remaining third of data interfaces have been assigned to be data transmission interfaces 117, which operate as part of data output path 157. The ratio between the data transmission interfaces 116 and the data transmission interfaces 117 may take any relative value that is available for a given total of data transmission interfaces 116, 117.

Transmission controller 119 of HBM 110 may be configured to assign and re-assign data transmission interfaces 116, 117 as either a part of data input path 156 or data output path 157. For example, transmission controller 119 may determine whether each data transmission interface 116, 117 is to operate as uni-directional input or a uni-directional output, and may then assign each data transmission interface 116, 117 with either an input or output designation. Additionally, computing unit 131 may be configured to send signals to HBM 110 that identify the data transmission interfaces that are to be a part of data input path 156 and data output path 157. For example, interface 138 of computing unit 130 may be configured to transmit one or more signals that contain assignment data identifying the total number of data transmission interfaces 116, 117 that can operate as either a data input or a data output. HBM 110 may receive the one or more signals at interface 118, and may transmit the assignment data to transmission controller 119. Transmission controller 119 may then assign transmission interfaces 116, 117 to operate as part of either the data input path or the data output path in accordance with the assignment data. This assignment data may include specifying a particular ratio of data transmission interfaces 116, 117 that are to be assigned to the data input and data output paths. Thus, HBM 110 may be configured to alter and control the relative bandwidth of its read operations and its write operations.

The memory 111 of system 101 may be configured as a plurality of memories. For example, memory 111 may include a plurality of memory dies that are configured as a memory stack, so as to transmit data between each of the memory dies and a base die. FIG. 2 is a block diagram 200 of a system 201 in which HBM 210 includes a base die 212 and a stack of memory dies 214. Memory dies 214 are configured within the stack so as to receive and transmit data from data transmission interfaces 116 and 117, respectively. In addition, memory dies can be configured to be in communication with transmission controller 119 and address-processing controller 112 of base die 212. Communication between HBM 210 and computing unit 130 can occur in the same manner as described herein in connection with system 101 of FIGS. 1A-B. However, transmission controller 119, address-processing controller 112, and computing device 130 of system 201 may each be configured to have read and write operations be performed in connection with specific sets of one or more memory dies 214. In addition, components of base die 212, such as address-processing controller 119, may be distributed across memory dies 214.

Figure 1B:
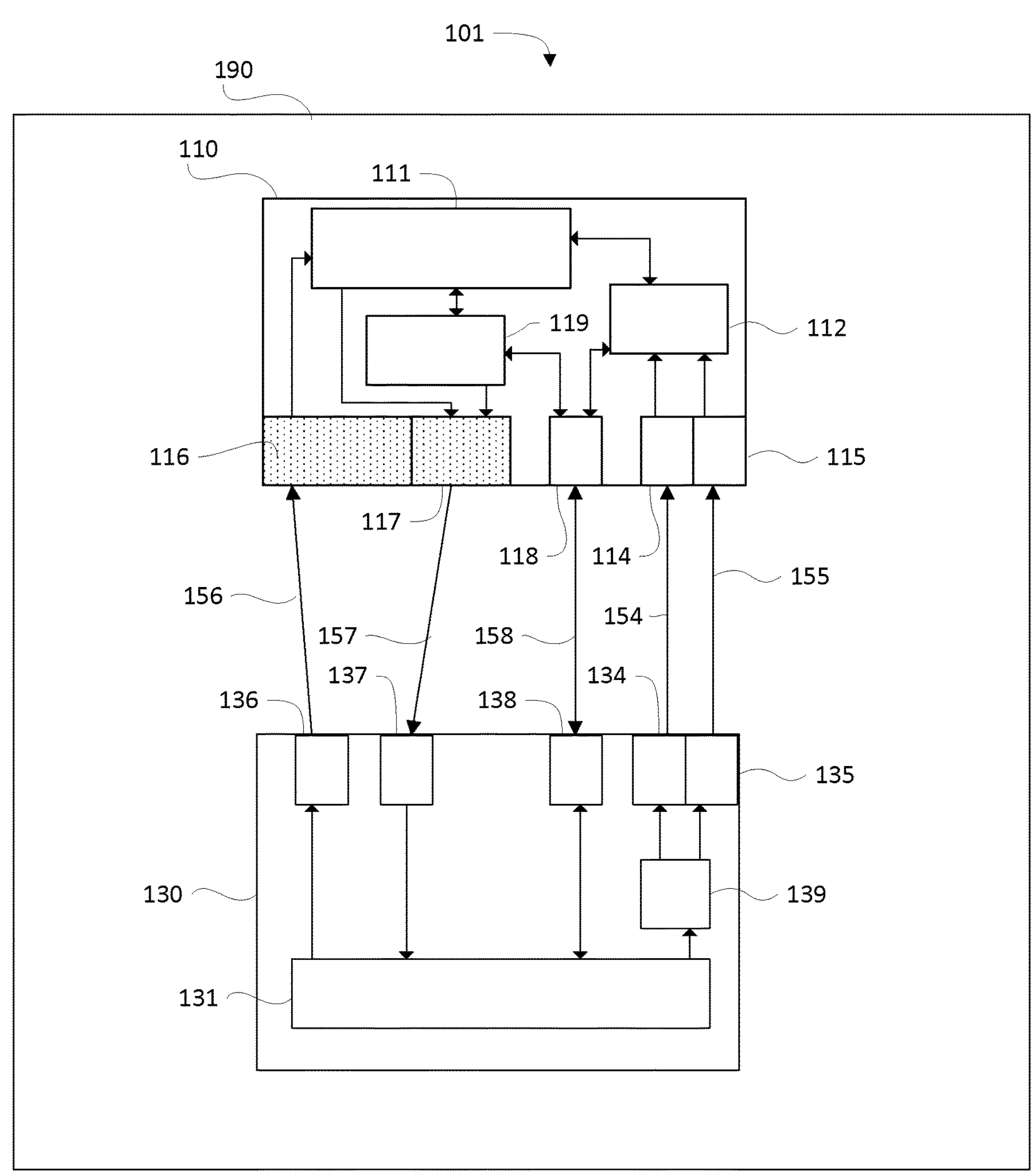
FIG. 1B is a block diagram of a system having altered the bandwidth of its read and write operations in accordance with aspects of the disclosure.
Figure 2:
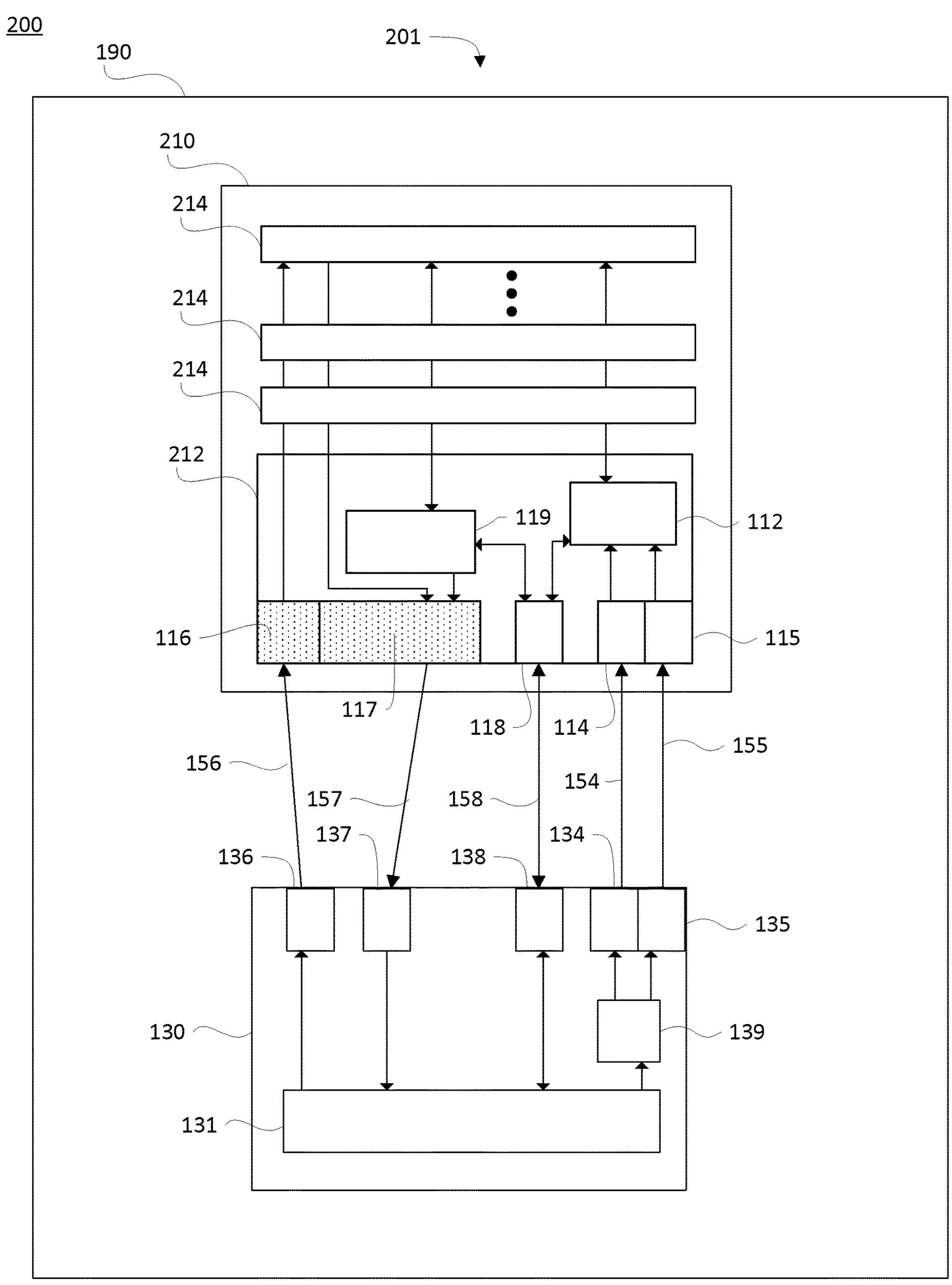
FIG. 2 is a block diagram of a system having a plurality of stacked memory dies in accordance with aspects of the disclosure.
Figure 3:
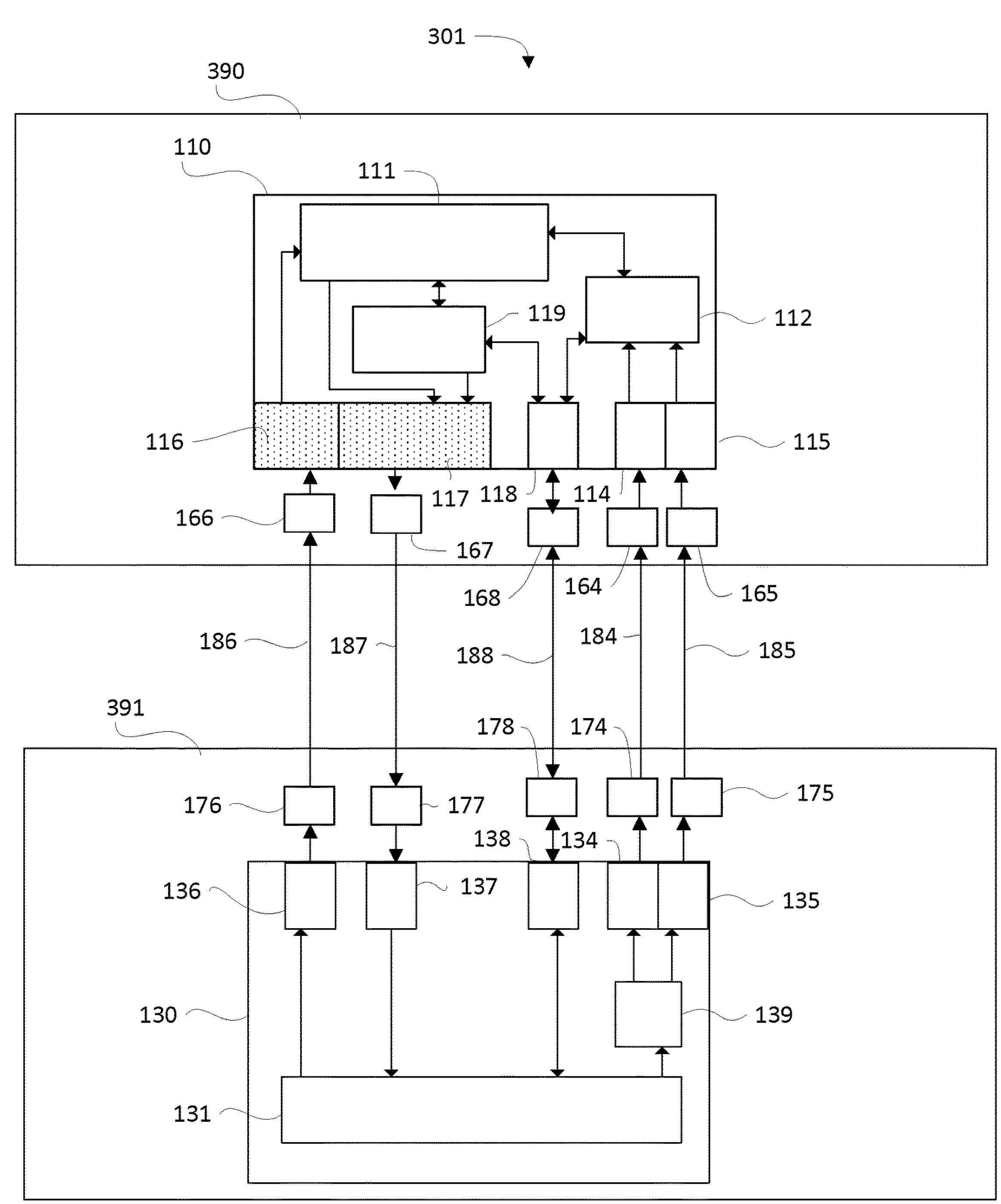
FIG. 3 is a block diagram of a system of two devices that are configured to perform read and write operations in accordance with aspects of the disclosure.

System 101 of FIGS. 1A-B include an HBM 110 and computing unit 130 on a substrate 190, which may be a part of a single device. The transmission between HBM 110 and computing unit 130 may take the form of an electrical connection within substrate 190. However, in accordance with aspects of the disclosure, HBM 110 and computing unit 130 may reside in separate devices. For example, FIG. 3 is a block diagram 300 of a system 301 in which HBM 110 resides on a first-device substrate 390 and computing unit 130 resides on a second-device substrate 391.

In addition, transmission paths 184-188 may take the form of optical paths, in which data is transmitted over optical cables. In system 301, the transmission interfaces for HBM 110 may include transmission interfaces 115-118 that are electrically connected to optical interfaces 164-168, while the transmission interfaces for computing unit 130 may include transmission interfaces 134-138 that are electrically connected to optical interfaces 174-178. The length of optical paths 184-188 may be 10 meters or more. Accordingly, HBM 110 and computing unit 130 may reside on devices that are located on devices that reside on different racks of servers. Similarly, HBM 210 and computing unit 130 of FIG. 2 may each reside on different substrates, including being within separate devices. In addition, the HBM 110 and 210 of systems 101, 201, and 301 may take the form of any high-bandwidth memory, such as dynamic random access memory devices. The HBM may also be configured to transmit data via peripheral component interconnect express (PCIe) connections. In addition, the computing unit 130 may be one of a variety of different types of processors, e.g., a CPU, GPU, an FPGA, an ASIC such as an TPU, etc.

Figure 4:
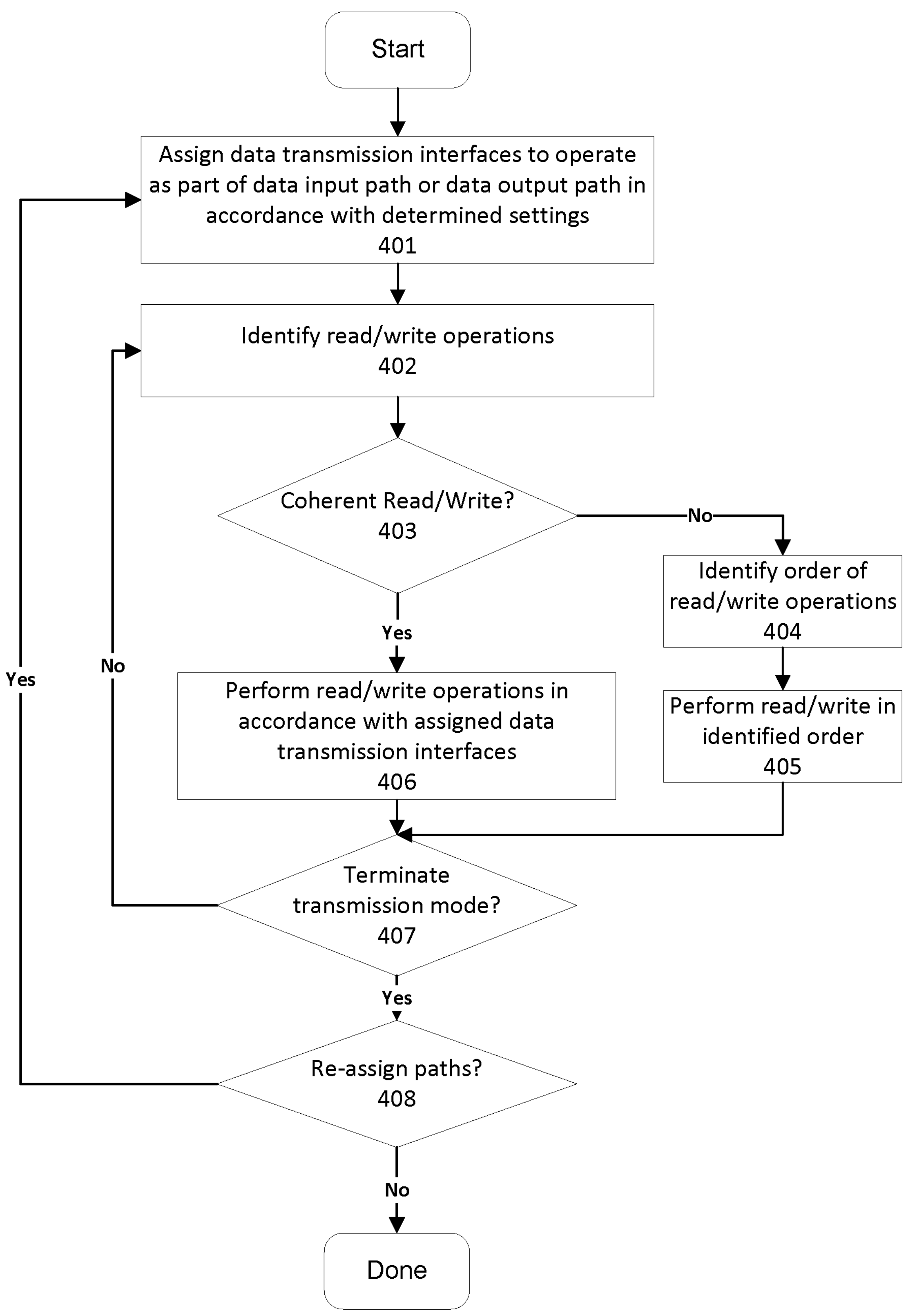
FIG. 4 is a flow diagram for performing read and write operations in accordance with aspects of the disclosure.

FIG. 4 is a flow diagram 400 in accordance with aspects of the disclosure. The components of systems 101 and 301 described above may perform one or more of the operations described in flow diagram 400. For example, HBM 110 of FIGS. 1-3, in communication with computing unit 130, may be configured to perform operations in accordance with flow diagram 400. While flow diagram 400 of FIG. 4 presents blocks 401-408 in a particular order, one or more operations associated with blocks 401-408 may be performed in another order in accordance with aspects of the disclosure. Some operations may also be removed and other operations added without deviating from aspects of the disclosure provided herein.

In accordance with block 401, an HBM may assign data transmission interfaces to operate as part of either a data input path or a data output path. The assignment of the data transmission interfaces may be in accordance with predetermined settings, including settings that the HBM received from a computing unit. The HBM may identify requests for read and write operations, such as those transmitted by a computing unit (block 402).

As described herein, the requests for read and write operations may be transmitted concurrently with one another. In accordance with block 403, a coherency check may be performed to identify any potential conflicts between the read and write operations. If a conflict is found to exist, the read and write operations are not coherent, and an analysis of the read and write operations is conducted to identify the proper order in which the read and write operations are to be performed (block 404). The HBM may proceed to perform the read and write operations in the identified order (block 405). If no conflict exists, so that the read and write operations are identified as being coherent, HBM may perform the read and write operations without requiring that they be performed in a particular order. Thus, read and write operations may be concurrently conducted in parallel to one another, with the read operation data being output by the data transmission interfaces that have been assigned to the data output path, and the write operation data being input by the data transmission interfaces that have been assigned to the data input path.

In accordance with block 407, a determination can be made whether to terminate the HBM's transmission mode. This may be based on the HBM completing the requested read and write operations and a determination being made that the HBM should enter into a non-transmission mode. The non-transmission mode may be based on diagnostics that are to be performed on the HBM, but may also be based on the HBM receiving a command to re-assign one or more of the data transmission interfaces. If HBM is not to terminate its current transmission mode, the system may proceed to identify additional read and write operations in accordance with block 402

If HBM receives a command to terminate its transmission mode (block 407), it may determine if the HBM has also been commanded to re-assign one or more data transmission interfaces (block 408). If it is determined that one or more of the data transmission interfaces are to be re-assigned, the HBM can perform the re-assignment in accordance with block 401, and the system can then proceed to again identify read and write operations in accordance with block 402. As discussed above, the re-assignment of the data transmission interfaces can result in a change in the relative number of data transmission interfaces that are included in the data input path and the data output path. Thus, HBM is capable of altering the relative bandwidth of its data input and data output paths.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for computing and memory communication comprising:

a computing unit; and a high-bandwidth memory (HBM), having a plurality of data transmission interfaces that are bi-directional, wherein the HBM is configured to access assignment data relating to read/write assignments for the plurality of data transmission interfaces and assign a first subset of the data transmission interfaces to operate unidirectionally as a data input path for receiving data corresponding to write operations based on the assignment data, and to assign a second subset of the data transmission interfaces to operate unidirectionally as a data output path for transmitting data corresponding to read operations based on the assignment data, and wherein the HBM is further configured to communicate with the computing unit so as to perform a read operation and a write operation in parallel.

2. The system of claim 1, wherein the HBM is configured to assign the first subset of data transmission interfaces and the second subset of the data transmission interfaces based on one or more inputs received from the computing unit.

3. The system of claim 1, wherein the assignment data comprises a determined relative ratio between a number of data transmission interfaces in the first subset and a number of data transmission interfaces in the second subset.

4. The system of claim 1, wherein the HBM is further configured to re-assign one or more data transmission interfaces of plurality of data transmission interfaces with respect to being in either the first subset or second subset.

5. The system of claim 4, wherein re-assigning the one or more data transmission interfaces results in altering a relative ratio of data transmission interfaces that are in the first subset and the second subset.

6. The system of claim 1, wherein the HBM is further configured to have a write-address input for receiving transmissions identifying one or more addresses for write operations and a read-address input for receiving transmissions identifying one or more addresses for read operations.

7. The system of claim 6, wherein the HBM is further configured to identify a coherency conflict in connection with one or more write operations and one or more read operations.

8. The system of claim 7, wherein the HBM is further configured to transmit coherency-related data to the computing unit.

9. The system of claim 6, wherein the HBM is further configured to perform the one or more write operations and read operations in a determined order based on identifying the coherency conflict.

10. A method for computing and memory communication comprising: accessing assignment data relating to read/write assignments for a plurality of data transmission interfaces; assigning, based on the assignment data, a first subset of data transmission interfaces that are bi-directional to operate unidirectionally as a data input path for receiving data corresponding to write operations and a second subset of data transmission interfaces to operate unidirectionally as a data output path for transmitting data corresponding to read operations; receiving, by a high-bandwidth memory (HBM), a first transmission identifying a read operation to be performed and a second transmission identifying a write operation to be performed; and performing, by the HBM, the write operation using the first subset of data transmission interfaces and the read operation using the second subset of data transmission interfaces.

11. The method of claim 10, wherein the write operation and the read operation are performed by the HBM in parallel.

12. The method of claim 10, wherein the HBM is configured to assign the first subset of data transmission interfaces and the second subset of the data transmission interfaces based on one or more inputs received from the computing unit.

13. The method of claim 11, wherein the first subset and second subset are assigned in accordance with a determined relative ratio identified within the assignment data.

14. The method of claim 10, further comprising re-assigning one or more data transmission interfaces with respect to being in the first subset or second subset.

15. The method of claim 14, wherein re-assigning the one or more data transmission interfaces results in altering a relative ratio of data transmission interfaces that are in the first subset and the second subset.

16. The method of claim 10, wherein the HBM receives the first transmission via a read-address input and the second transmission via a write-address input.

17. The method of claim 16, further comprising identifying a coherency conflict in connection with one or more write operations and one or more read operations.

18. The method of claim 17, further comprising transmitting, by the HBM, coherency-related data to the computing unit.

19. The method of claim 16, further comprising performing, by the HBM, the one or more write operations and read operations in a determined order based on the coherency conflict.

* * * * *